US011754960B1

(12) United States Patent
McDaniel et al.

(10) Patent No.: US 11,754,960 B1
(45) Date of Patent: Sep. 12, 2023

(54) PARAMETERS PARTICULAR TO CONSUMABLE ITEM AND AFFECTING ESTIMATED REMAINING LIFE OF CONSUMABLE ITEM

(71) Applicant: Hewlett-Packard Development Company, L.P., Spring, TX (US)

(72) Inventors: Gabriel Scott McDaniel, Boise, ID (US); Jeffrey H. Luke, Boise, ID (US); Paul L. Jeran, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/869,166

(22) Filed: Jul. 20, 2022

(51) Int. Cl.
 *G03G 15/00* (2006.01)
 *G06K 15/02* (2006.01)

(52) U.S. Cl.
 CPC ....... *G03G 15/553* (2013.01); *G06K 15/1823* (2013.01)

(58) Field of Classification Search
 CPC .......................... G03G 15/553; G03G 15/1823
 USPC ............................................... 399/14, 25, 27
 See application file for complete search history.

(56) References Cited

U.S. PATENT DOCUMENTS

| 6,295,423 B1 * | 9/2001 | Haines | B41J 2/17523 |
| | | | 399/9 |
| 8,891,983 B2 * | 11/2014 | Tamagaki | G03G 15/556 |
| | | | 399/35 |

* cited by examiner

*Primary Examiner* — Hoan H Tran
(74) *Attorney, Agent, or Firm* — Michael Dryja

(57) ABSTRACT

Parameters particular to the consumable item and that affect calculation of an estimated remaining life of the consumable item when used in the printing device for printing are received. A payload is constructed based on the parameters. The printing device is to use the parameters when calculating the estimated remaining life of the consumable item during usage of the consumable item for printing.

20 Claims, 12 Drawing Sheets

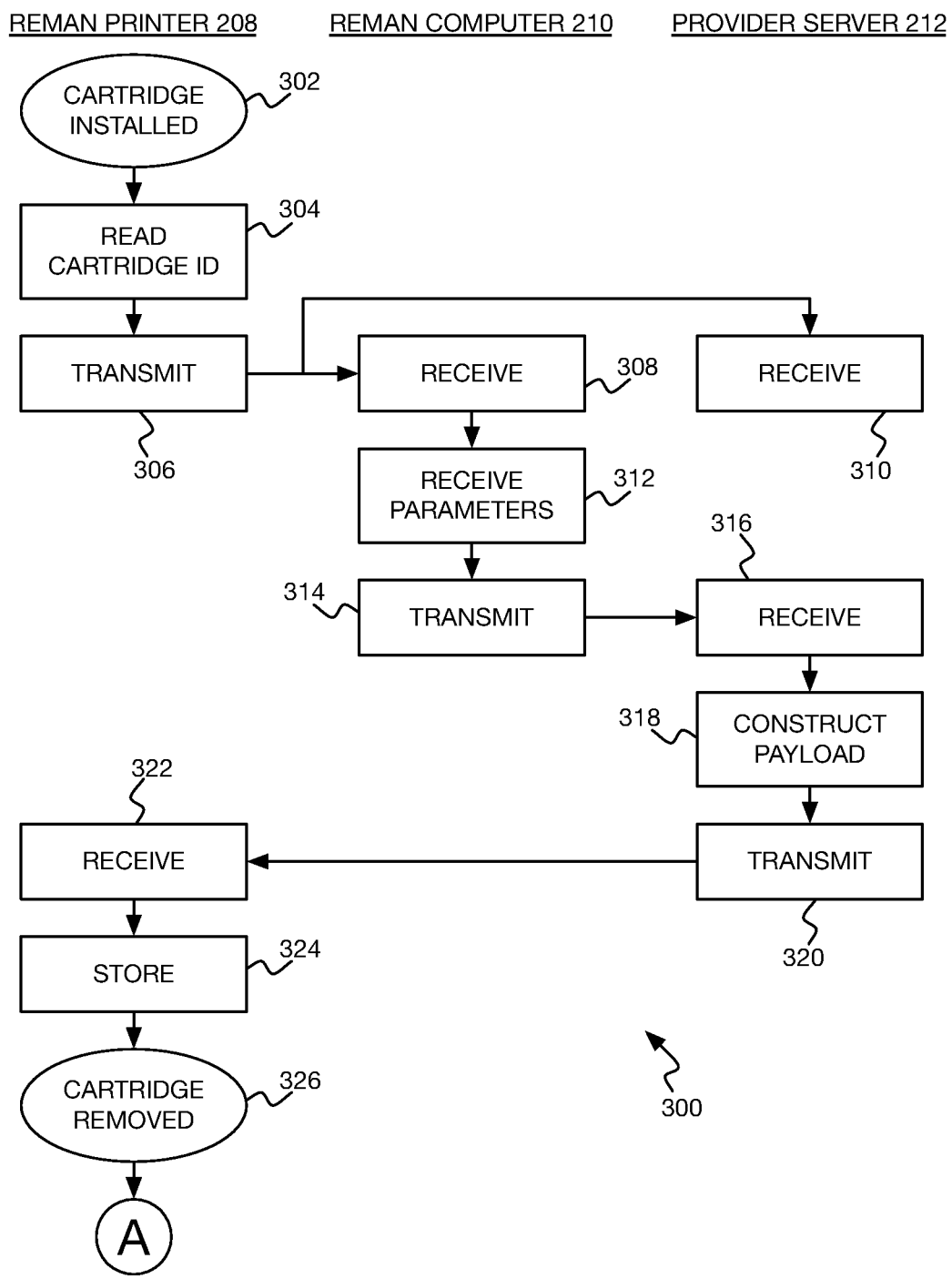

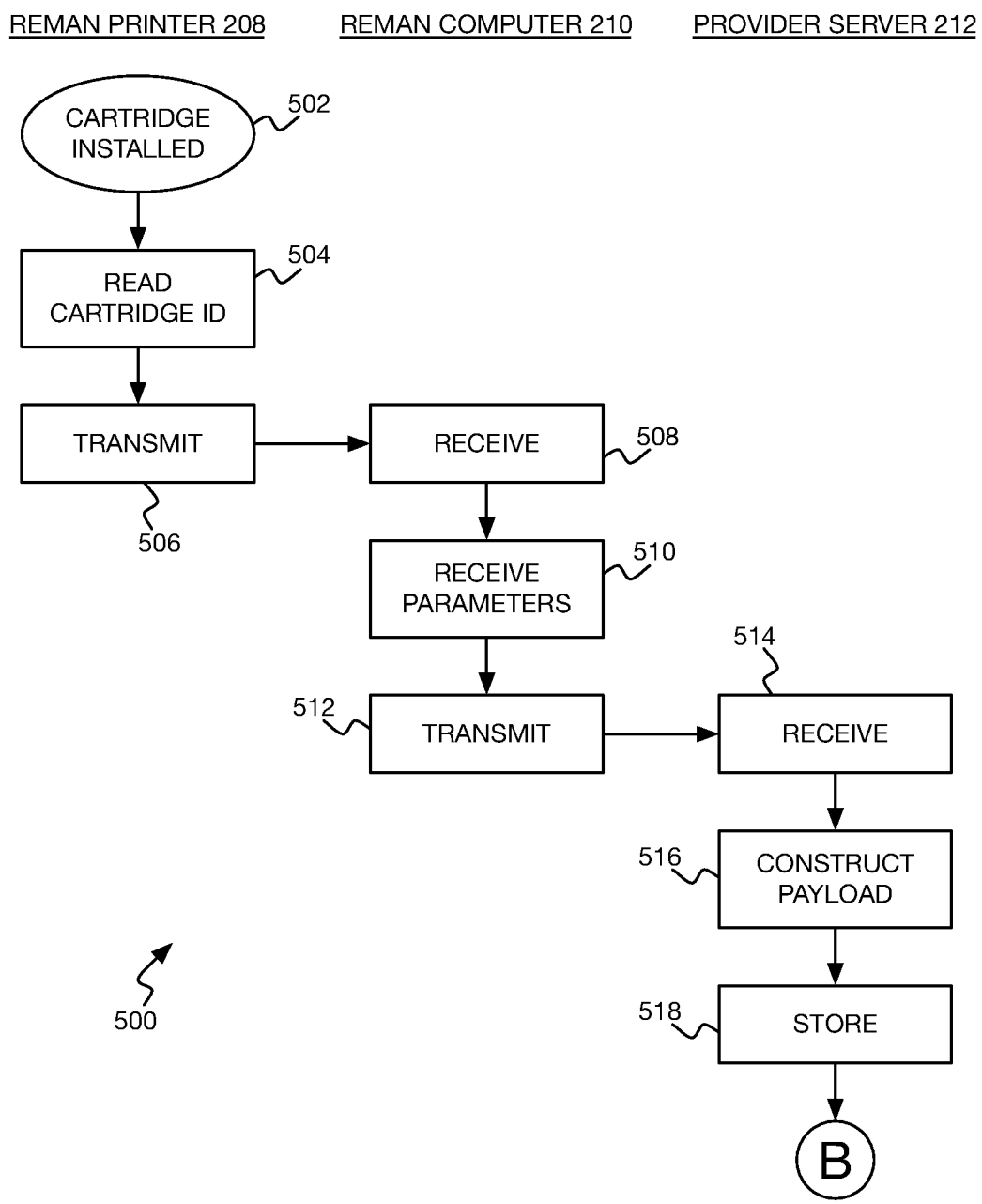

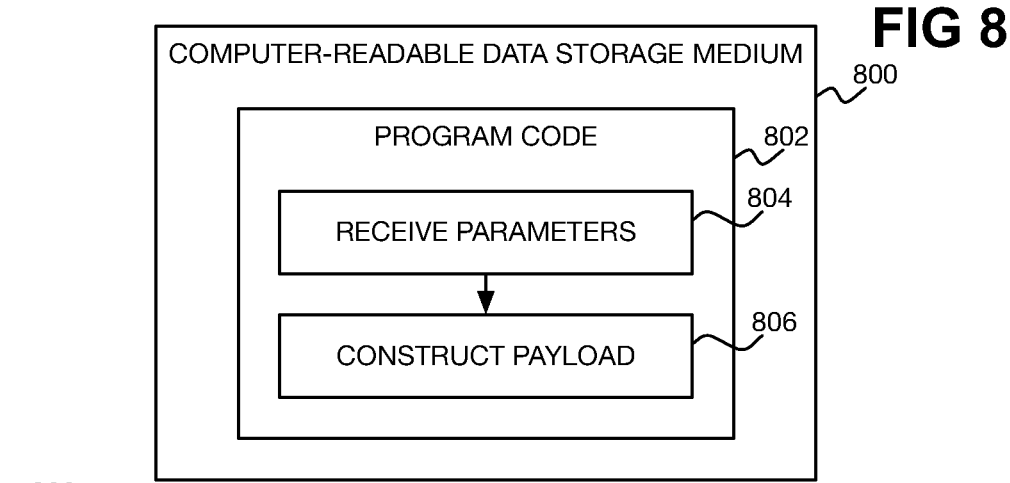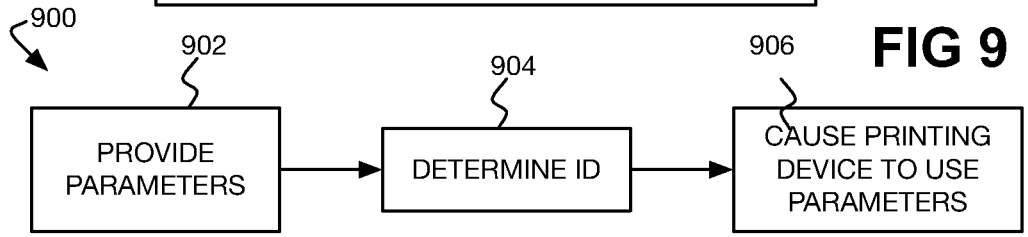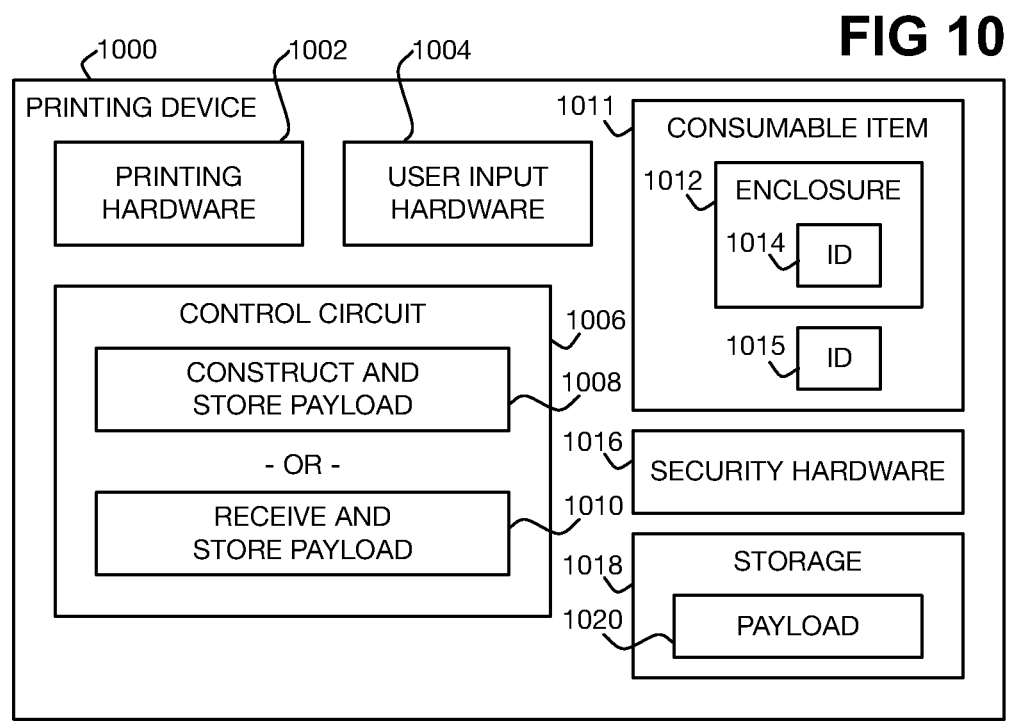

US 11,754,960 B1

PARAMETERS PARTICULAR TO CONSUMABLE ITEM AND AFFECTING ESTIMATED REMAINING LIFE OF CONSUMABLE ITEM

BACKGROUND

Printing devices can use a variety of different technologies to form images on media such as paper or to build three-dimensional (3D) objects. Such technologies include dry electrophotography (EP) and liquid EP (LEP) technologies, which may be considered as different types of laser and light-emitting diode (LED) printing technologies, as well as inkjet-printing technologies and three-dimensional (3D) printing technologies. Printing devices deposit print material, such as colorant like toner, ink (which can include other printing fluids or material as well), or 3D print material.

BRIEF DESCRIPTION OF THE DRAWINGS

FIGS. 3A, 3B, 4, 5A, 5B, 6, 7A, and 7B are flowcharts of example methods for receiving parameters particular to a toner cartridge and affecting its remaining life, for programming a payload encoding the parameters into the cartridge, and for using the parameters to estimate the remaining life.

FIG. 8 is a diagram of an example non-transitory computer-readable data storage medium.

FIG. 9 is a flowchart of an example method.

FIG. 10 is a diagram of an example printing device.

DETAILED DESCRIPTION

Figure 1A:
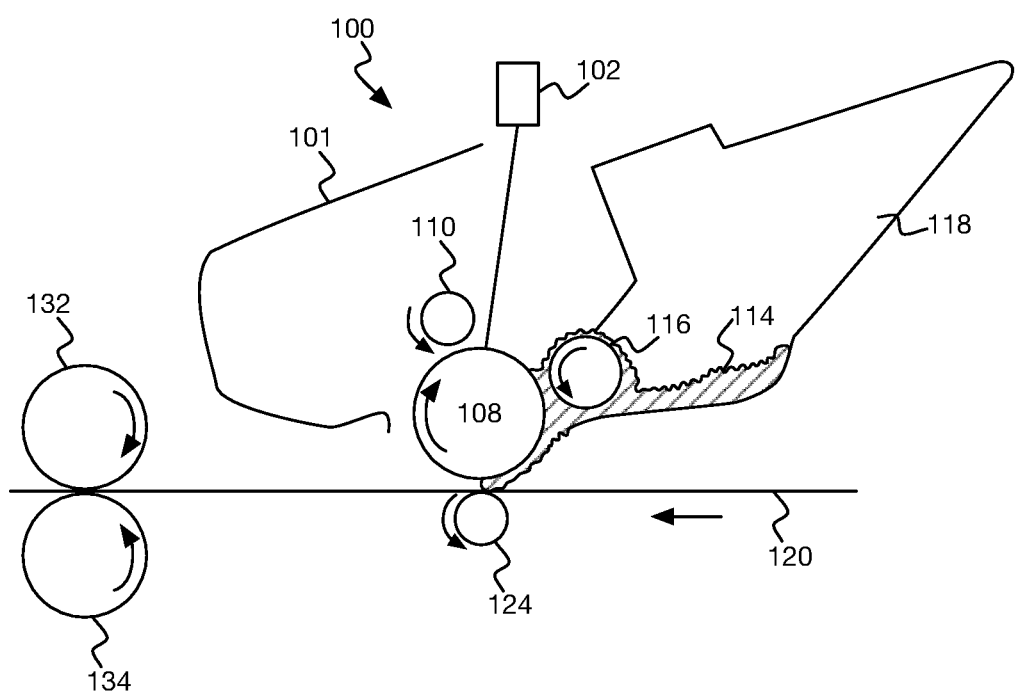
FIGS. 1A and 1B are a diagram and a block diagram, respectively, of an example toner cartridge for a laser printing device.

As noted in the background, printing devices deposit print material to form images on media or, in the case of three-dimensional (3D) printing devices, to additively build (3D) objects. A printing device can include a cartridge of print material, such as a toner cartridge in the case of a laser printing device, which the device uses for printing. As the device prints print jobs, print material is consumed from the cartridge. When the cartridge is empty or is running low on print material, the cartridge may be replaced with a replacement that has a fresh (e.g., full) supply of print material.

A cartridge, such as a toner cartridge, is thus one type of a consumable item that a printing device uses for printing. Other examples include fuser assemblies, developer assemblies, and so on, in the case of a laser printing device. In the case of a fluid-ejection (e.g., inkjet) device, consumable items can include replaceable fluid-ejection cartridges having both printheads and fluid (e.g., ink), as well as separately replaceable printheads and fluid supplies.

As a consumable item is used within a printing device for printing, its remaining life decreases until the item is depleted or exhausted and has to be replaced for printing to continue. The printing device may periodically (e.g., after each print job) estimate the remaining life of the consumable item. In this way, the user of the device can monitor how much remaining life is left so as to know when a replacement should be ordered. The remaining life may also be reported to a cloud service that automatically ships a replacement to the user.

Different parameters can affect calculation of the estimated remaining life of a consumable item as the item is used for printing. These parameters may be set to manufacturer-specific or nominal values, and programmed into the consumable item itself or otherwise provided to the printing device. The printing device therefore uses the values when estimating the remaining life of the consumable item.

Some types of consumable items, such as toner cartridges, are not infrequently remanufactured for repeated usage. For example, a remanufacturer may receive an empty toner cartridge, refill it with toner, and potentially replace other components within the cartridge. The type of toner and the types of other components used by the remanufacturer may differ from those installed by the cartridge's original manufacturer.

Installation of different types of components (including toner both as to its type and amount) in a consumable item during remanufacture can result in inaccurate estimation of the remaining life of the item during subsequent usage for printing. The manufacturer-specific or nominal parameters may be particular to the originally installed components, and not to the remanufacturer's components that are now in the consumable item. Because the parameters do not accurately reflect the remanufacturer's components, the estimated remaining life that is calculated based on the parameters can be inaccurate.

A toner cartridge may, for example, be estimated as having its remaining life depleted when in fact the cartridge still has toner. The cartridge may be prematurely replaced, resulting in unnecessary waste and cost. As another example, a cartridge may be estimated as having useful life remaining when in fact the cartridge has become depleted of toner. As a result, the user may not yet have ordered a fresh cartridge, or a fresh cartridge may not yet have been automatically shipped to the user, such that the user may be unable to print.

Techniques described herein ameliorate these and other issues. Parameters particular to a consumable item and that affect calculation of the estimated remaining life of the consumable item when used in a printing device for printing are stored on the item in the form of a payload constructed based on the parameters. For instance, each time a consumable item is remanufactured, the parameters can be updated to accurately reflect the specific types of replacement components installed in the device. Estimated remaining life calculation thus remains accurate even after remanufacture.

The techniques are particularly described herein by way of example in relation to a toner cartridge for a laser printing device. However, the techniques are not limited to usage in conjunction with a toner cartridge, and are more generally applicable to other types of consumable items for printing devices. Such other consumable items may also be for laser printing devices, or for other types of printing devices, such as inkjet printing devices.

FIG. 1A shows an example toner cartridge 100 that can be used within a laser printing device for printing. The toner cartridge 100 can include other components in addition to or other than those depicted in the figure, such as a waste bin, a wiper blade, a drum shutter, and so on. The cartridge 100 includes an enclosure 101 in which a photoconductor drum 108 is disposed that is made from a highly photoconductive material that is discharged by light photons. The photoconductor drum 108 may also be referred to as a photoreceptor drum, a photoconductor, an optical photoconductor, or an organic photoconductor.

The drum 108 is initially given a total positive (or alternatively negative) charge via a charge roller 110 disposed in the enclosure 101 of the cartridge 100. The charge roller 110 may be referred to as a primary charge roller and rotates counter-clockwise. The charge roller 110 is in contact with the drum 108 during image formation on a sheet of media 120, such as paper, for precise alignment of the image to be formed on the media 120. At other times, during non-use, the charge roller 110 may be separated from the drum 108.

As the drum 108 revolves, a laser beam emanates from a laser beam light source 102 of the laser printing device onto a surface of the drum 108 to discharge certain points in accordance with an image. In this way, the laser draws, or scans, the image to be printed as a pattern of electrical charges, which can be referred to as an electrostatic image. The drum 108 rotates clockwise.

After the pattern has been set, the drum 108 is coated with charged toner 114, which is a fine powder, from a toner hopper 118 disposed in the enclosure 101 of the cartridge 100 via a developer roller 116 that is also disposed in the enclosure 101 and that may be a magnetic roller. The toner 114 may have a positive (or alternatively negative) charge. The toner 114 clings to the discharged areas of the drum 108, but not to the positively (or alternatively negatively) charged background.

Specifically, the toner 114 is dispensed by the developer roller 116 rotating against the drum 108 after having rotated through the toner hopper 118 to pick up the toner 114. The developer roller 116 may also be in contact with the drum 108 during image formation on the media 120 for precise alignment of the image to be formed on the media 120. At other times, during non-use, the developer roller 116 may be separated from the drum 108.

With the powder pattern affixed, the drum 108 rolls over a sheet of media 120, which moves from right to left. A transfer roller 124 of the laser printing device rotates in the opposite direction (i.e., counter-clockwise) to the drum 108 to press the media 120 against the drum 108. The media 120 pulls the powder away from the drum 108. The media 120 moves at the same speed as the drum 108 and therefore picks up the image pattern exactly.

The media 120 finally passes between an upper fuser roller 132 and a lower pressure roller 134 that rotate in opposite directions. As the media 120 passes through these rollers 132 and 134, the loose toner 114 powder melts, fusing with the fibers in the media 120. The rollers 132 and 134 roll the media 120 to an output tray, providing a printed page.

The toner stored within the toner hopper 118 of the toner cartridge 100 is a single color. A single color (e.g., black-and-white) printing device may employ just one cartridge 100. By comparison, a multiple-color device can have multiple cartridges 100 of different colors installed therein. For certain components of the printing device, such as the transfer roller 124, there may be a corresponding component for each color of cartridge 100, whereas other components, such as the rollers 132 and 134, may be shared.

Figure 1B:
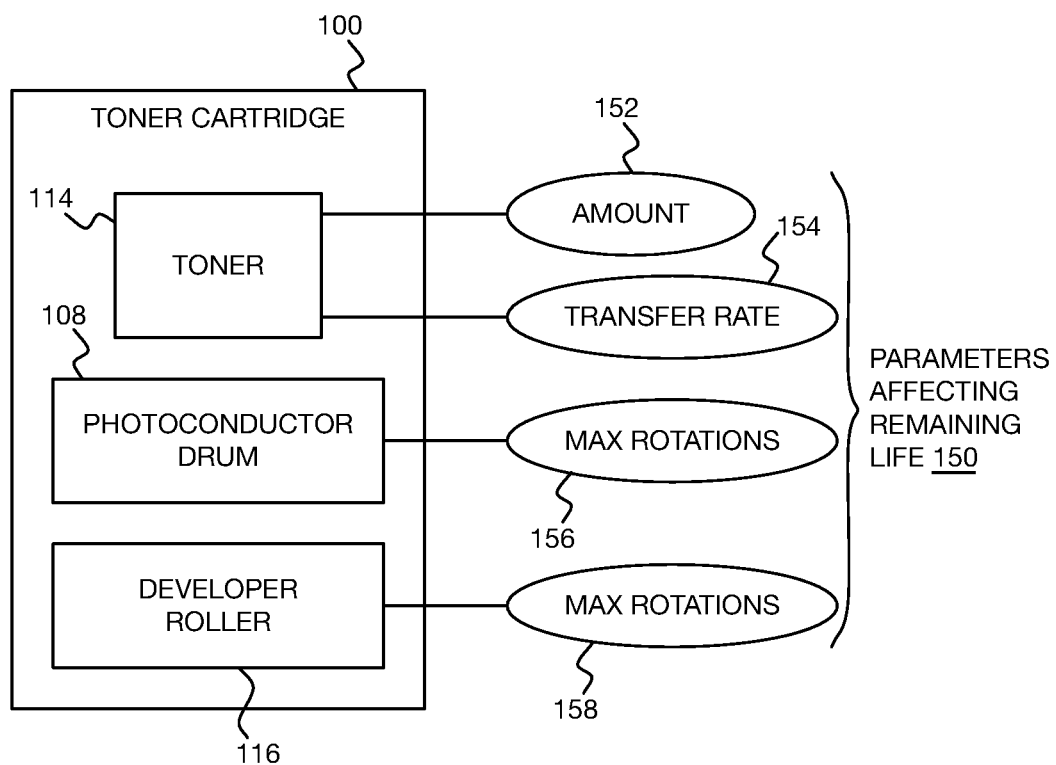

FIG. 1B shows parameters 150 that are particular to the toner cartridge 100 and that affect calculation of the estimated remaining life of the cartridge 100 when used in a laser printing device for printing. The parameters 150 can include the initially filled amount 152 of toner 114 in the cartridge 100. The parameters 150 can include the transfer rate 154 at which the toner 114 is depleted from the cartridge 100 when used by the laser printing device to print a pixel or other image unit.

The parameters 150 can include the maximum rotations 156 of the photoconductor drum 108. The maximum rotations 156 is the maximum number of times that the drum 108 can be rotated before the useful life of the drum 108 is exhausted. The parameters 150 can include the maximum rotations 158 of the developer roller 116, which similarly is the maximum number of times that the roller 116 can be rotated before its useful life is exhausted.

The estimated remaining life of the cartridge 100 may be represented as the lowest of the remaining toner 114 within the cartridge 100, the remaining number of times the photoconductor drum 108 can be rotated, and the remaining number of times the developer roller 116 can be rotated. As toner 114 is depleted from the cartridge 100 for printing, the percentage of toner 114 remaining in the cartridge 100 can be calculated as the ratio of the difference between the initially filled amount of toner 114 and the product of the number of pixels (or other image units) that have been printed so far and the toner transfer rate 154, to the initially filled amount of toner 114—i.e., Initially Filled Amount−(Pixels Printed×Transfer Rate)/Initially Filled Amount'

As the photoconductor drum 108 is rotated, the percentage of rotations of the drum 108 remaining can be calculated as the ratio of the difference between the maximum rotations 156 and the number of times the drum 108 has been rotated so far, to the maximum rotations 156—i.e., (Maximum Rotations−Number of Rotations)/Maximum Rotations'

Similarly, as the developer roller 116 is rotated, the percentage of rotations of the roller 116 remaining can be calculated as the ratio of the difference between the maximum rotations 158 and the number of times the roller 116 has been rotated so far to maximum rotations 158.

The estimated remaining life of the cartridge 100 is thus the lowest of these three calculated percentages. The remaining life of the cartridge 100 may be considered an estimated remaining life because the amount of toner 114 remaining within the cartridge 100 is not actually measured but rather is estimated from the number of pixels that have been printed and the expected toner transfer rate 154. The remaining life of the cartridge 100 may also be considered an estimated remaining life because the maximum rotations 156 and 158 of the drum 108 and roller 116 may be (pessimistically) estimated.

Figure 2:
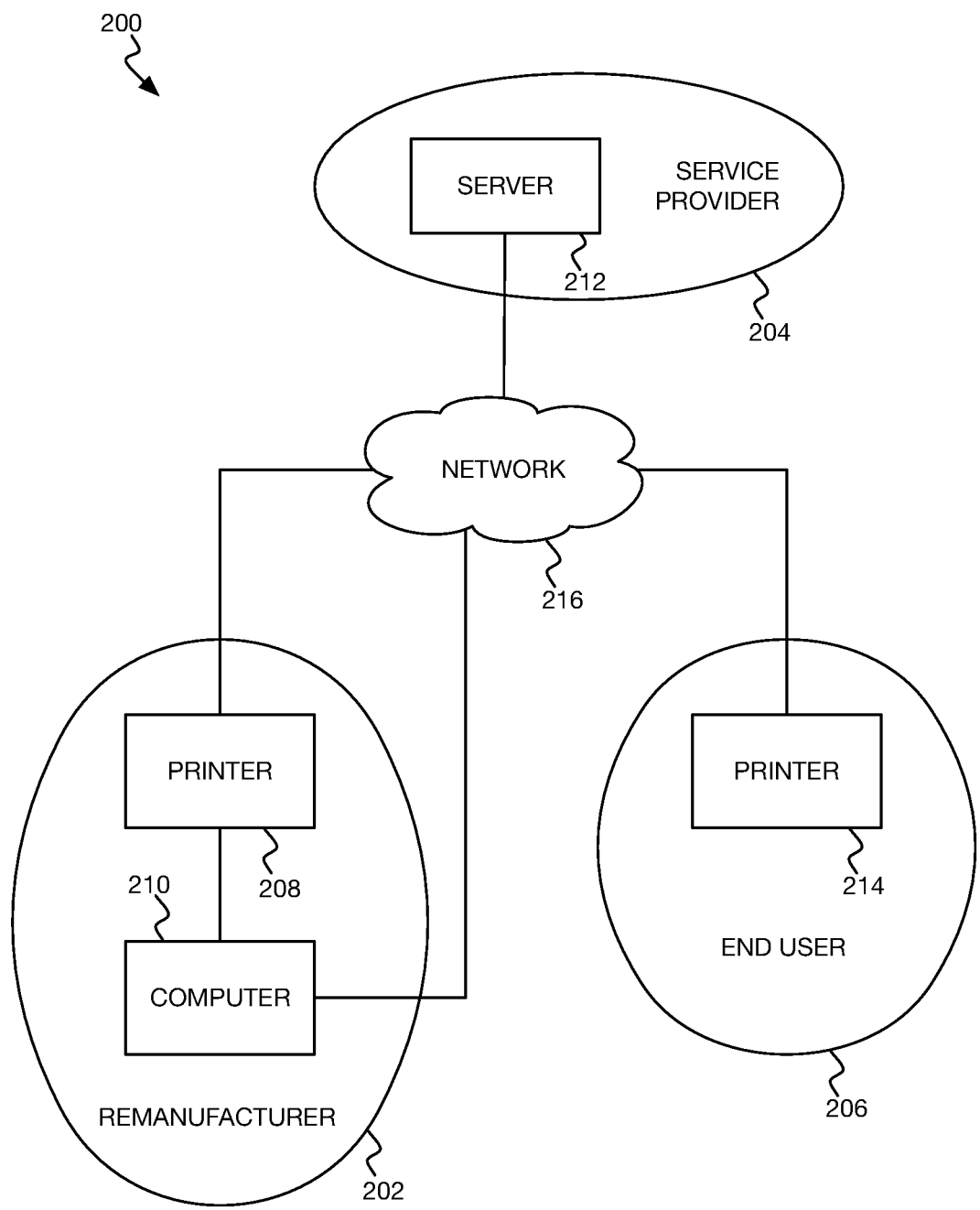
FIG. 2 is a diagram of an example system in which a payload encoding parameters particular to a toner cartridge and affecting estimated remaining life of the cartridge can be programmed into the cartridge.

FIG. 2 shows an example system 200 in which the payload encoding the parameters 150 particular to the toner cartridge 100 and that affect calculation of the estimated remaining life can be programmed in the cartridge 100 and thus used to calculate the estimated remaining life during usage of the cartridge 100 for printing. The system 200 can be dispersed over two or more of three locations: the location 202 of the remanufacturer of the cartridge 100; the location 204 of a service provider; and the location 206 of an end user of the cartridge 100. The service provider may be the original manufacturer of the cartridge 100, or may be acting on behalf or for the manufacturer.

At the remanufacturer location 202, there is a printer 208 in which the toner cartridge 100 can be installed, and a computer 210. The printer 208 is more generally a printing device, and can be referred to as the remanufacturer printer 208. The printer 208 may nominally be a printer in that the cartridge 100 can be installed in the printer 208, but the printer 208 may not actually be used for printing and/or may not actually be able to print.

The computer 210 is more generally a computing device, and can be referred to as the remanufacturer computer 210. The computer 210 may be a desktop, notebook, or laptop computer. The computer 210 may be a different type of computing device as well, such as a smartphone, a personal digital assistant (PDA) device, a tablet computing device, and so on.

At the service provider location 204, there is a server 212, which is more generally a computing device, and which can be referred to as the service provider server 212. The server 212 may implement a cloud service of the service provider for usage by the remanufacturer of the toner cartridge 100. At the end user location 206, there is a printer 214 in which the cartridge 100 can be installed by an end user of the printer 214 for printing. The printer 214 is more generally a printing device, and which can be referred and as the end user printer 214. The end user printer 214 and the remanufacturer printer 208 may be the same or different type of printer, but the cartridge 100 is compatible with both.

The system 200 includes a network 216, which may be or include the Internet as one example. Either or both of the printer 208 and the computer 210 at the remanufacturer location 202 are communicatively connected to the network 216. The server 212 at the service provider location 204 and the printer 214 at the end user location 206 are also communicatively connected to the network 216. The printer 208 and/or the computer 210, as well as the server 212 and the printer 214, can thus be communicatively connected with one another via or over the network 216.

Figure 3B:
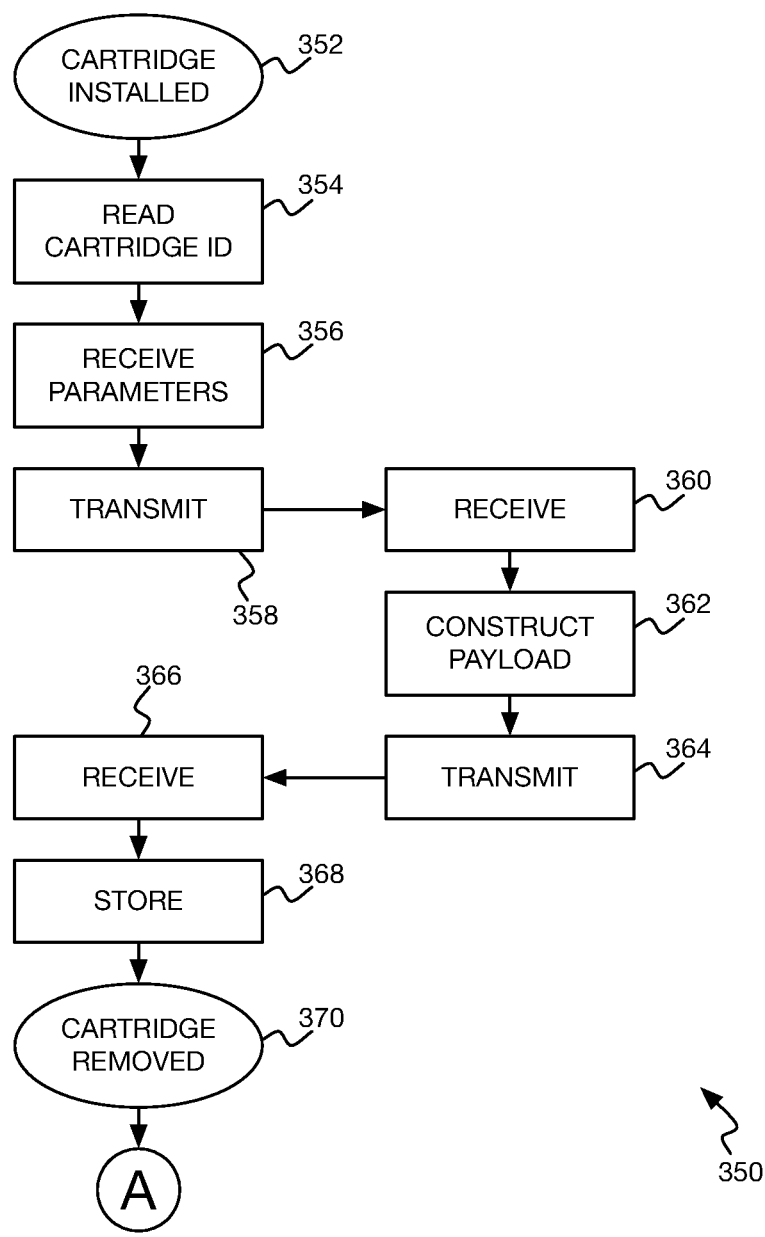

FIGS. 3A and 3B show respective methods 300 and 350 for constructing a payload based on the parameters 150 of the toner cartridge 100 and storing the payload in the cartridge 100. In the methods 300 and 350, the cloud service implemented by the service provider server 212 constructs the payload and transmits it to the remanufacturer printer 208, which stores the payload on the cartridge 100. (In another implementation, the payload may instead be stored on a printer, such as the printer 214 at the end user location 206.) One difference between the methods 300 and 350 is that the former includes usage of the remanufacturer computer 210, whereas the latter does not. Either the method 300 or 350 can be performed.

Referring to FIG. 3A, in the method 300 the toner cartridge 100 is installed within the printer 208 at the location 202 of the remanufacturer (302). The printer 208 reads a cartridge identifier from the cartridge 100 (304). The cartridge identifier may in the form of a security-hardened integrated circuit (IC) that is readable just by corresponding security hardware of the printer 208, such as a security-hardened application-specific IC (ASIC). The cartridge identifier may be in the form of a different type of electronically or electrically readable code as well, such as an RFID, an NFC tag, or a BLE identifier. The cartridge identifier may be readable just when the cartridge 100 is installed a printer such as the printer 208, and not readable when not installed within a printer.

The remanufacturer printer 208 transmits the cartridge identifier, which may uniquely identify the cartridge 100, to the remanufacturer computer 210 and the service provider server 212 (306), which each receive the identifier (308, 310). The computer 210 may be directly connected to the printer 208, wirelessly or in a wired manner, such that the printer 208 may directly transmit the identifier to the computer 210. The computer 210 may instead be connected to the printer 208 over a network, such as the network 216, in which case the printer 208 transmits the identifier to the computer over the network 216. The printer 208 transmits the identifier to the server 212 over the network 216 as well.

The remanufacturer computer 210 receives the parameters 150 particular to the toner cartridge 100 and that affect calculation of the estimated remaining life of the cartridge 100 (312). For example, a user such as a remanufacturer employee may enter at the computer 210 in the parameters 150, indicating the amount 152 of toner 114 that has been filled in the cartridge 100 and the transfer rate 154 of the toner 114, either of which may differ from the amount 152 and the transfer rate 154 of the original toner 114 during initial manufacture. The user may also enter the maximum rotations 156 and 158 of the replacement photoconductor drum 108 and the replacement developer roller 116, which also may differ from the maximum rotations 156 and 158 of the original drum 108 and the original roller 116 during initial manufacture.

The remanufacturer computer 210 transmits the cartridge identifier received from the remanufacturer printer 208 and the parameters 150 entered at the computer 210 over the network 216 to the service provider server 212 (314), which receives this information (316). The server 212 in turn constructs a payload based on the parameters 150 (318). For instance, the server 212 may encode the parameters 150 into the format in which they are to be stored on the toner cartridge 100. For example, the format may be that the toner amount 152 is to be specified in a certain number of bytes, followed by the transfer rate 154 in a certain number of bytes, and then each of the maximum rotations 156 and 158 in that order in a certain number of bytes. The cartridge identifier may also be encoded within the payload.

The service provider computer 210 transmits the payload over the network 216 to the remanufacturer printer 208 (320), which receives the payload (322). The toner cartridge 100 is still installed within the printer 208 in the example, and therefore the printer 208 can store the payload on the cartridge 100 (324). For example, the cartridge 100 may store the payload within a non-volatile memory or other storage that is part of the cartridge 100. The cartridge 100 can then be removed from the printer 208 at the location 202 of the remanufacturer (326) prior to providing the cartridge 100 to the end user at the location 206, with processing subsequently proceeding to A in FIG. 4 that is described later in the detailed description.

Referring to FIG. 3B, in the method 350 the toner cartridge 100 is again installed within the printer 208 at the location 202 of the remanufacturer (352), and the printer 208 may read the cartridge identifier from the cartridge 100 (354). However, in the method 350, the printer 208 receives the parameters 150 of the cartridge 100 (356). For example, the printer 208 may have user input hardware such as a control panel, a display, a keyboard, and/or a touchscreen by which a user of the manufacturer is able to enter the parameters 150 directly at the printer 208, instead of at the remanufacturer computer 210 as in the method 300.

The remanufacturer printer 208 transmits the parameters 150, and may also transmit the parameters cartridge identifier, over the network 216 to the service provider server 212 (358), which receives this information (360). The server 212 constructs the payload as before (362), and transmits it over the network 216 to the printer 208 (364), which receives and stores the payload as before (366, 368). The toner cartridge 100 can then be removed from the printer 208 (370), with processing subsequently proceeding to A in FIG. 4 as in the method 300. In one implementation of the method 350, the cartridge 100 may not have a cartridge identifier, and/or the printer 208 may not read and/or transmit the cartridge identifier to the server 212.

Figure 4:
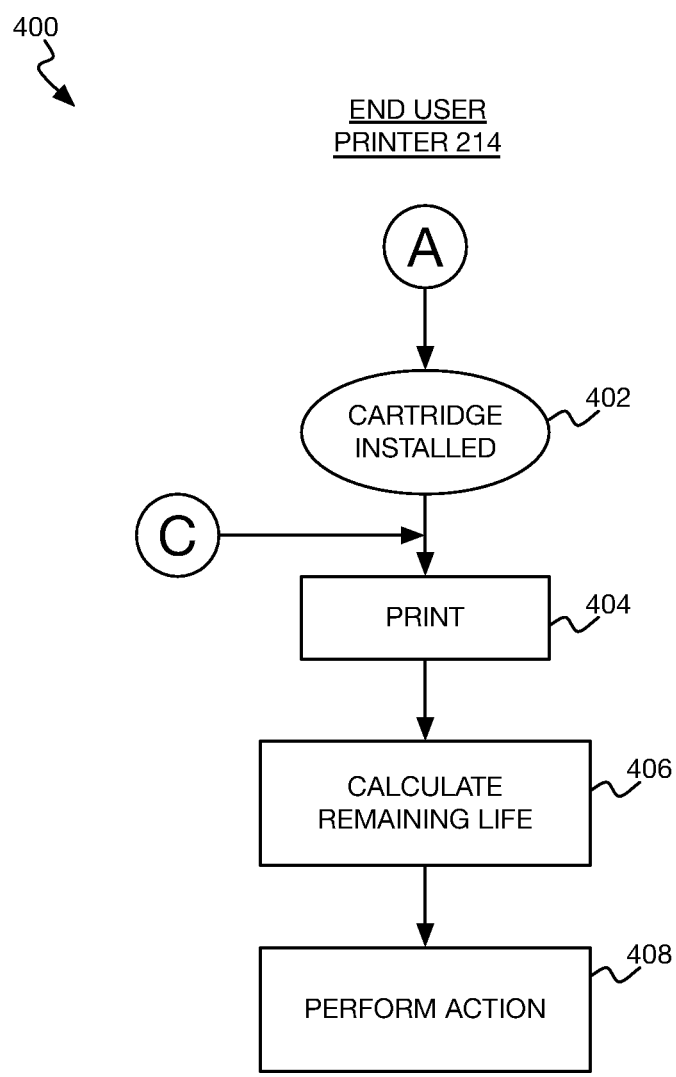

FIG. 4 shows an example method 400 that is performed after the payload has been constructed and stored on the toner cartridge 100. The printer 214 at the location 206 of the end user performs the method 400. Therefore, the method 400 is performed after the remanufacturer has finished remanufacture of the cartridge 100 at its location 202, and has provided (e.g., sold) the cartridge 100 to the end user. The method 400 can begin at A with installation of the cartridge 100 in the printer 214 (402), or at C if the cartridge 100 has already been installed in the printer 214.

The end user printer 214 prints using the toner cartridge 100 (404). For example, the printer 214 may be communicatively connected to a computer or other computing device of the end user, from which the printer 214 receives print jobs to print onto sheets of media like paper using toner 114 from the cartridge 100. As the printer 214 prints using the cartridge 100, the toner 114 becomes depleted from the cartridge 100, and the number of rotations of the photoconductor drum 108 and the developer roller 116 increases.

Therefore, the end user printer 214 periodically calculates the estimated remaining life of the toner cartridge 100 (406), as has been described. If the estimated remaining life of the cartridge decreases below a threshold, then the printer 214 may perform an action in response (408). There may be multiple thresholds, with different actions being performed at each threshold. For example, at a higher threshold, the printer 214 may alert the user that the cartridge 100 is nearing (but has not yet reached) the end of its remaining life, so that the user has ample time to order a replacement cartridge 100.

As a second example, the end user printer 214 at this same or different threshold may communicate with the service provider server 212 or another server (such as that of the service provider or the remanufacturer), to cause a fresh toner cartridge 100 to be sent to the end user. The end user may have a subscription by which such a replacement cartridge 100 is automatically sent. The end user may instead be sent a message, such as an email, reminding the user to order another cartridge 100 to have on hand when the installed cartridge 100 reaches its end of life.

As a third example, at the same or different threshold, the end user printer 214 may automatically or with user permission use a different print mode to potentially extend the remaining life of the toner cartridge 100. For example, the estimated remaining life of the cartridge 100 may have decreased below this threshold due to the remaining amount of toner 114 in the printer becoming low. In this case, the printer 214 may continue printing in a draft mode, in which less toner 114 is used to print a given image, to conserve the remaining amount.

As a fourth example, at a lower threshold, the end user printer 214 may alert the user that the toner cartridge 100 has reached the end of its life. At this or an even lower threshold, the printer 214 may no longer print (or attempt to print) using the installed cartridge 100. For instance, continued usage of the cartridge 100 within the printer 214 may potentially cause damage to the printer 214. Therefore, the printer 214 disables usage of the cartridge 100 for printing to prevent such potential damage.

Figure 5B:
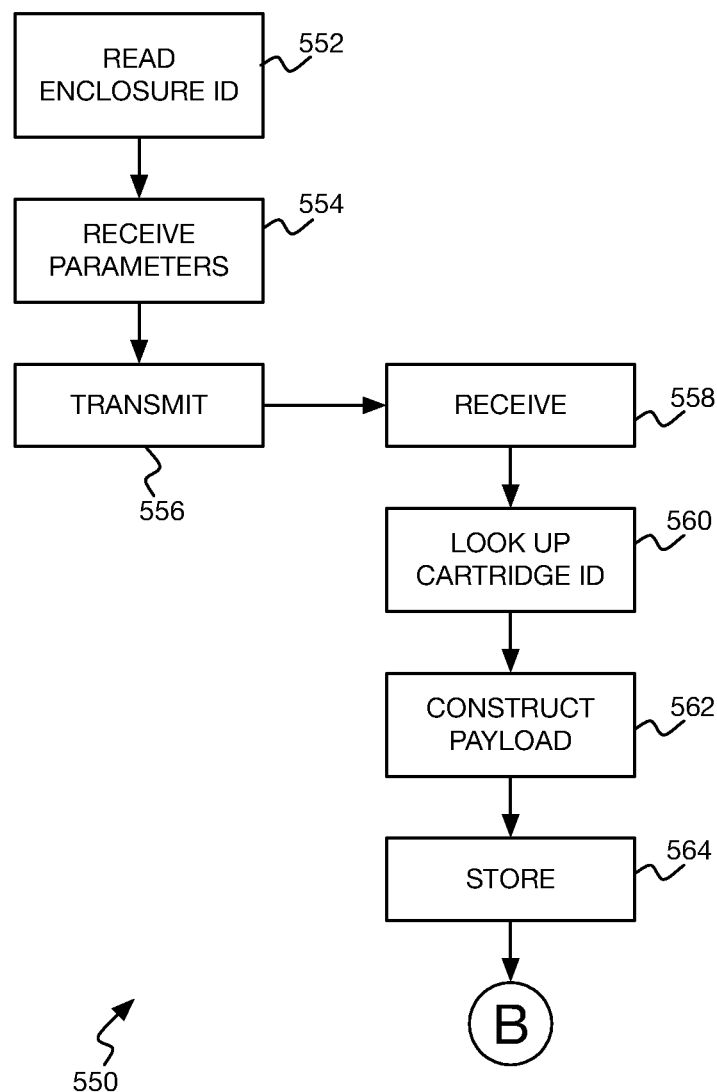

FIGS. 5A and 5B show respective methods 500 and 550 for constructing a payload based on the parameters 150 of the toner cartridge 100 for subsequent transmission to the end user printer 214 for storage on the cartridge 100 upon installation of the cartridge 100 within the printer 214. Unlike in the methods 300 and 350, the remanufacturer printer 208 does not have to be communicatively connected to the network 216 in the method 500 and does not communicate to the service provider server 212. Unlike in the methods 300 and 350, the cartridge 100 does not have to be installed the remanufacturer printer 208 in the method 550, and the remanufacturer may not even have a printer 208 at its location 202. Either the method 500 or 550 can be performed.

Referring to FIG. 5A, in the method 500 the toner cartridge 100 is installed within the remanufacturer printer 208 (502), and the printer 208 reads the cartridge identifier from the cartridge 100 (504), as before. However, in the method 500 the printer 208 transmits the cartridge identifier to the remanufacturer computer 210 (506), which receives the identifier (508). The printer 208 may not be communicatively connected to the network 216, for instance, and does not have to transmit the identifier to the service provider server 212. The printer 208 may be directly connected, wirelessly or in a wired manner, to the computer 210, or may be connected to the computer 210 over a network other than the network 216.

The remanufacturer computer 210 receives the parameters 150 of the toner cartridge 100 (510) as before, and transmit them along with the cartridge identifier over the network 216 to the service provider server 212 (512). The server 212 thus receives the cartridge identifier and the parameters 150 of the cartridge 100 (514), and constructs the payload based on the parameters 150 (516) as before. The server 212 at this time, however, stores the payload in association with the identifier (518), such as within a database, for subsequent retrieval and transmission to the end user printer 214 once the cartridge 100 has been provided to the end user and installed within the printer 214. Processing continues with B in FIG. 6, which is described later in the detailed description.

Referring to FIG. 5B, in the method 550 the printer 208 at the remanufacturer location 202 is not involved, and indeed the remanufacturer may not have to have a printer 208 at its location 202. Rather, the remanufacturer reads (i.e., receives) an enclosure identifier from the enclosure 101 of the toner cartridge 100 (552). The enclosure identifier is also an identifier of and can uniquely identify the cartridge 100, like the cartridge identifier, but is different than the cartridge identifier at least in the respect that it can be read without having to install the cartridge 100 within a printer such as the printer 208.

The enclosure identifier may be an optically, human, or electronically or electrically readable code printed on the enclosure 101 of the toner cartridge 100 or printed on a label affixed to the enclosure 101. The enclosure identifier may be in the form of a RFID, an NFC tag, or a BLE identifier, for instance, which is readable by the remanufacturer computer 210 or a suitable electronic reader device communicatively connected to the computer 210. The enclosure identifier may be in the form of a code, such as a barcode or a QR code, which is optically readable by a suitable code reader device communicatively connected to the computer 210. The enclosure identifier may be in the form of human-readable characters, which may be read by a user such as a remanufacturer employee and manually entered on the computer 210.

The remanufacturer computer 210 also receives the parameters 150 of the toner cartridge 100 (554) as before. The computer 210 responsively transmits the enclosure identifier and the parameters 150 of the cartridge 100 over the network 216 to the service provider server 212 (556), which receives this information (558). The server 212 looks up the cartridge identifier of the cartridge 100 using the enclosure identifier of the cartridge 100 (560). For instance, the cartridge identifier may have been previously stored in association with the enclosure identifier in a database.

The service provider server 212 then constructs the payload based on the parameters 150 (562) as before. As in the method 500, the server 212 at this time does not transmit the parameters 150 to a printer in which the toner cartridge 100 has been installed, and indeed the cartridge 100 may not yet be installed in any printer. Rather, the server 212 in the method 550 also stores the payload in association with the cartridge identifier (564), such as within a database for subsequent retrieval and transmission, with processing then proceeding to B in FIG. 6.

Figure 6:
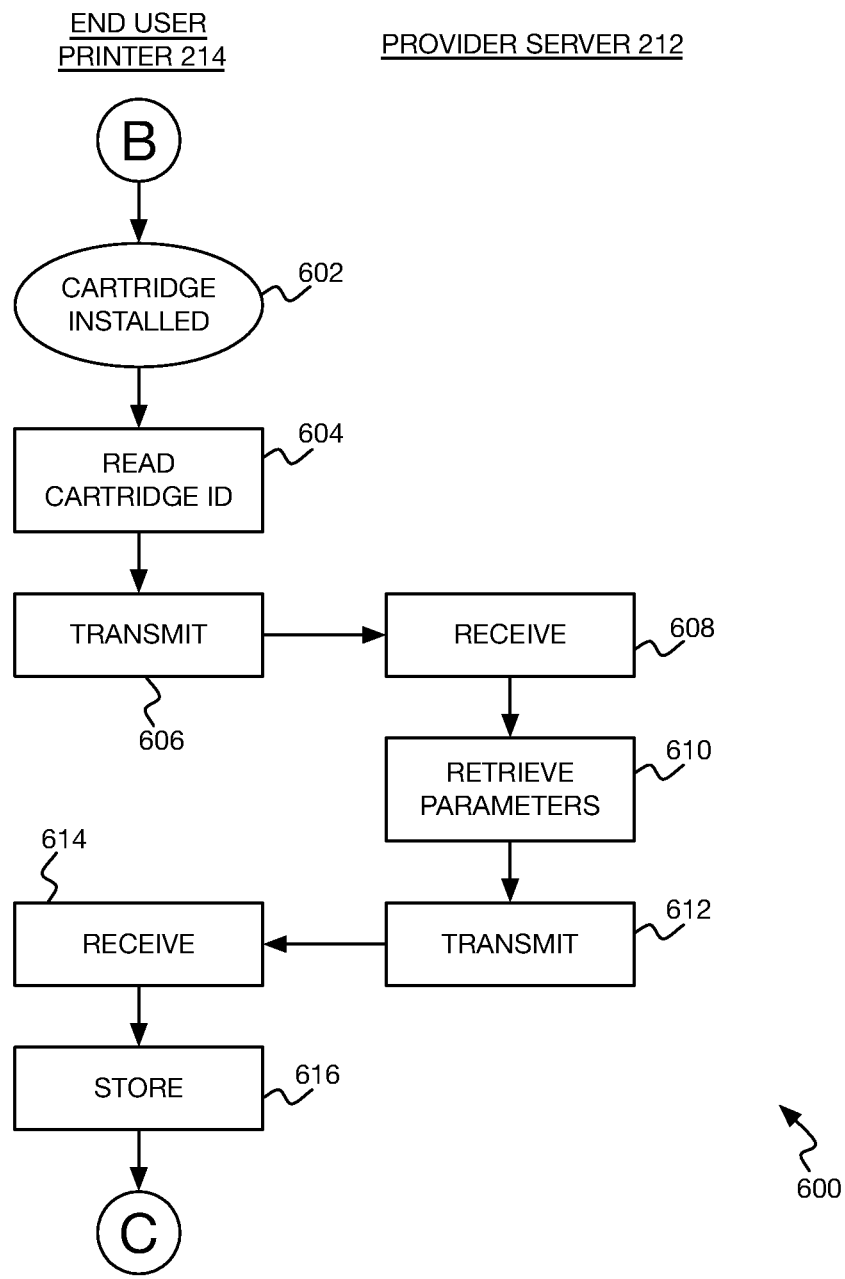

FIG. 6 shows an example method 600 that is performed after the payload has been constructed and stored at the service provider server 212. The method 600 is described in relation to the toner cartridge 100 being installed in the printer 214 at the location 206 of the end user, and then ending with continued processing at C in FIG. 4. However, in another implementation, the method 600 can instead be performed in relation to the cartridge 100 being installed in the printer 208 at the location 202 of the remanufacturer, and then ending with removal of the cartridge 100 from the printer 208 and continued processing at A in FIG. 4. In the example, then, the method 600 can begin at B with installation of the toner cartridge 100 in the end user printer 214 (602).

The end user printer 214 responsively reads the cartridge identifier from the toner cartridge 100 (604), and transmits the identifier over the network 216 to the service provider server 212 (606), which thus receives the cartridge identifier (608). The server 212 uses the cartridge identifier to retrieve the payload encoding the parameters 150 of the cartridge 100 that it previously constructed and stored in association with this identifier (610), such as within a database. The server 212 then in response transmits the payload over the network 216 to the end user printer 214 (612), which receives and stores it in the cartridge 100 (614, 616). Processing proceeds to C in FIG. 4, in which the printer 214 uses the parameters 150 encoded in the payload to calculate the estimated remaining life of the cartridge 100.

Figure 7A:
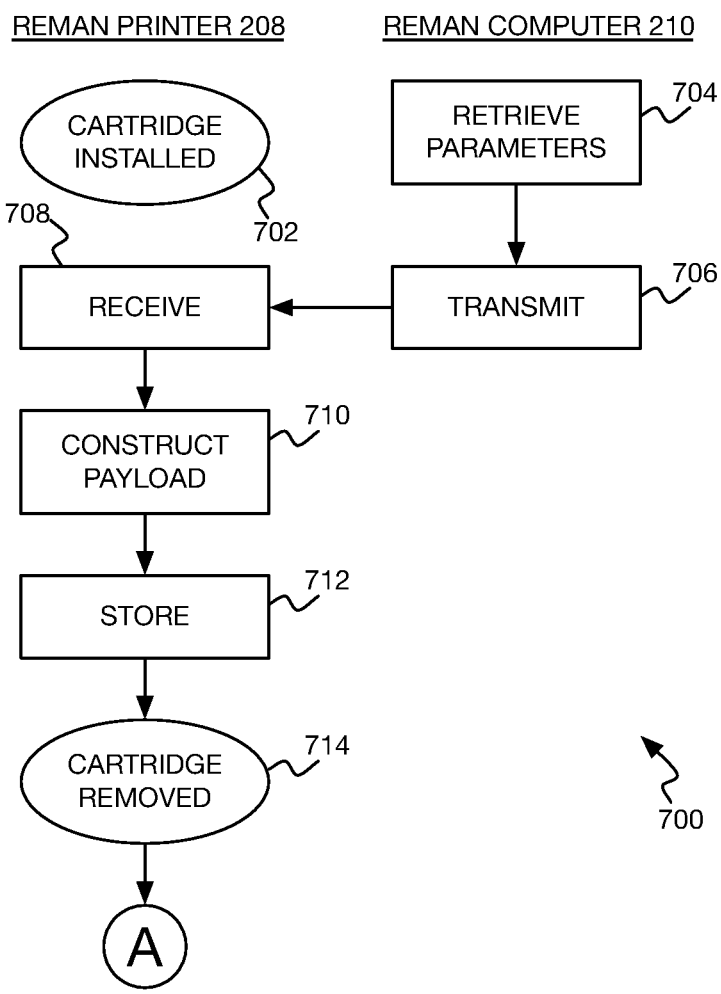
Figure 7B:
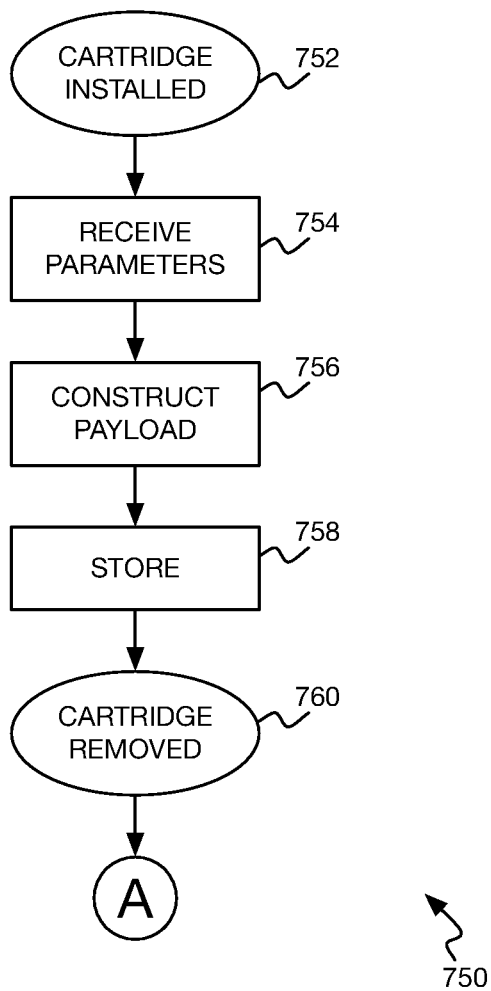

FIGS. 7A and 7B show respective methods 700 and 750 for constructing a payload based on the parameters 150 of the toner cartridge 100 and storing the payload in the cartridge 100. Unlike in the methods 300 and 350 and in the methods 500 and 550, the service provider server 212 does not construct the payload in the methods 700 and 750. The methods 700 and 750 can be used in an implementation in which no cloud service is provided by a service provider using a server 212. One difference between the methods 700 and 750 is that the former includes usage of the remanufacturer computer 210, whereas the latter does not. Either the method 700 or 750 can be performed, and neither the cartridge nor the enclosure identifier is needed in either method.

Referring to FIG. 7A, in the method 700 the toner cartridge 100 is installed within the printer 208 at the location 202 of the remanufacturer (702), and the computer 210 at this location receives the parameters 150 of the cartridge 100 (704), as before. The computer 210, which may be connected to the printer 208 directly or via a network, transmits the parameters 150 to the printer 208 (706), which receives them (708). The printer 208 constructs the payload based on the parameters 150 (710) as has been described, and stores the payload encoding the parameters 150 on the cartridge 100 (712).

In the depicted example, the remanufacturer computer 210 transmits the parameters 150, and the remanufacturer printer 208 constructs the payload. In another implementation, the computer 210 instead of the printer 208 may construct the payload, with the computer 210 transmitting the payload instead of the parameters 150 to the printer 208.

The cartridge 100 in either case can then be removed from the printer (714). Processing proceeds to A in FIG. 4, in which the cartridge 100 is installed within the printer 214 at the location 206 of the end user and the printer 214 uses the parameters 150 encoded in the payload to calculate the estimated remaining life of the cartridge 100.

Referring to FIG. 7B, in the method 750 the toner cartridge 100 is again installed within the printer 208 at the location 202 of the remanufacturer (752). However, in the method 750, the printer 208, instead of the remanufacturer computer 210, receives the parameters 150 of the cartridge 100 (754). Likewise, the printer 208 and not the computer 210 constructs the payload based on the parameters 150 in the method 750 (756). The printer 208 stores the payload encoding the parameters 150 in the cartridge 100 (758), with the cartridge 100 then removed from the printer 208 (760) before proceeding to A in FIG. 4 as before.

The methods 300 and 350 of FIGS. 3A and 3B, the methods 500 and 550 of FIGS. 5A and 5B, and the methods 700 and 750 of FIGS. 7A and 7B can each be used in conjunction with the method 400 of FIG. 4 and/or the method 600 of FIG. 6, in conjunction with just the method 400 or just the method 600, or separately. The methods 300 and 350, 500 and 550, and 700 and 750 can each be modified to include elements of another of these methods. The methods 400 and 600 can be used in conjunction with one another or separately, and the method 400 can be modified to include elements of the method 600 and vice-versa.

FIG. 8 shows an example non-transitory computer-readable data storage medium 800 storing program code 802 executable by a processor to perform processing. The processor may be that of the remanufacturer printer 208 and/or the service provider server 212. The processing includes receiving parameters particular to a consumable item and that affect calculation of an estimated remaining life of the consumable item when used in a printing device, such as the end user printer 214, for printing (804). The processing includes constructing a payload based on the parameters and that the printing device, such as the printer 214, is to use when calculating the estimated remaining life of the consumable item during usage of the consumable item for printing (806).

FIG. 9 shows an example method 900 that can be performed at the location 202 of the remanufacturer. The method 900 includes providing parameters particular to a consumable item that affect calculation of an estimated remaining life of the consumable item when used in a printing device, such as the end user printer 214, for printing (902). The parameters may be provided via their entry at the remanufacturer printer 208 or computer 210, for instance.

The method 900 can include determining an identifier of the consumable item (904). The identifier may be a first identifier, such as enclosure identifier, and/or a second identifier, such as a cartridge identifier. The latter identifier may be determined by installing the consumable item within a printer, such as the remanufacturer printer 208. The former identifier may be determined by causing a computer, such as the remanufacturer computer 210, to read the identifier.

The method 900 includes causing the printing device, such as the end user printer 214, to use a payload constructed based on the parameters when calculating the estimated remaining life of the consumable item during usage of the consumable item for printing (906). Causing the printing device to use the payload in this manner can include providing the consumable item to the end user. The end user then installs the consumable item in the printer 214 for usage in calculating the estimated remaining life of the item.

FIG. 10 shows an example printing device 1000. The printing device 1000 may be a standalone printer, or an all-in-one (AIO) printing device that includes other functionality, such as scanning, copying, and/or faxing functionality, in addition to printing functionality. The printing device 1000 includes printing hardware 1002 that prints using a consumable item 1011 installed within the device 1000. The printing hardware 1002 may be laser printing hardware in the case of a laser printing device, and inkjet printing hardware in the case of an inkjet printing device, for instance.

The printing device 1000 can include user input hardware 1004, such as a control panel, a display, a keyboard, and/or a touchscreen, by which a user can provide input to and otherwise interact with the device 1000. The printing device 1000 can include a control circuit 1006. The control circuit 1006 can construct and store a payload based on parameters particular to the consumable item 1011 and that affect calculation of an estimated remaining life of the item 1011 when used during printing (1008), or can receive and store the payload as has been previously constructed based on the parameters (1010).

The control circuit 1006 may be considered as including a processor and memory, which may more generally be considered as non-transitory computer-readable data storage medium. The processor and memory may be integrated within an ASIC, or the processor may be a general-purpose processor, in which case the memory may be a separate semiconductor or other type of memory. The control circuit 1006 can execute instructions or program code.

The consumable item 1011 includes an enclosure 1012 on which there may be a first identifier 1014. The consumable item 1011 has a second identifier 1015, either in addition to or in lieu of the first identifier 1014. The first identifier 1014 is readable even when the consumable item 1011 is not installed within the printing device 1000, whereas the second identifier 1015 may be readable just by the printing device 1000 and when installed in the device 1000. The first identifier 1014 may be an enclosure identifier, whereas the second identifier 1015 may be a cartridge identifier.

The printing device 1000 can include security hardware 1016. The security hardware 1016 may be a security-hardened ASIC, or other hardware, which is used to securely read the second identifier 1015 of the consumable item 1011 installed within the device 1000. The printing device 1000 can include a storage 1018, such as a non-volatile memory, which is used to store a payload 1020 constructed based on the parameters for subsequent estimation of the remaining life of the consumable item 1011.

Techniques have been described herein for accurate estimation of the remaining life of a printing device consumable item, such as a print material cartridge like a toner cartridge, even when components of the item have been replaced or renewed, such as during remanufacture. Parameters governing calculation of estimated remaining life can be particular to the consumable item in that they differ depending on the specific replacement or renewal components used within the consumable item as compared to the original components of the item. By having these parameters encoded within a payload stored on the consumable item, a printing device is therefore able to accurately calculate the remaining life of the item.

We claim:

1. A non-transitory computer-readable data storage medium storing program executable by a processor to perform processing comprising:

receiving parameters particular to a consumable item and that affect calculation of an estimated remaining life of the consumable item when used in a printing device for printing; and constructing a payload based on the parameters and that the printing device is to use when calculating the estimated remaining life of the consumable item during usage of the consumable item for printing.

2. The non-transitory computer-readable data storage medium of claim 1, wherein the printing device is to perform an action in response to the calculated estimated remaining life decreasing below a threshold.

3. The non-transitory computer-readable data storage medium of claim 1, wherein the consumable item comprises a security-hardened integrated circuit (IC) storing an identifier of the consumable item and that is readable just by corresponding security hardware of the printing device, and wherein the processing further comprises receiving the identifier over a network from the printing device in which the consumable item is installed.

4. The non-transitory computer-readable data storage medium of claim 3, wherein the processor is part of a first computing device, wherein receiving the parameters comprises receiving the parameters particular to the consumable item having the identifier over the network from a second computing device, and wherein the processing further comprises transmitting the payload over the network to the printing device for storage within the consumable item.

5. The non-transitory computer-readable data storage medium of claim 1, wherein the processor is part of the printing device, wherein receiving the parameters comprises receiving user entry of the parameters at user input hardware of the printing device, and wherein the processing further comprises storing the payload within the printing device.

6. The non-transitory computer-readable data storage medium of claim 1, wherein the processor is part of the printing device, wherein receiving the parameters comprises receiving the parameters from a computing device communicatively connected to the printing device, and wherein the processing further comprises storing the payload within the printing device.

7. The non-transitory computer-readable data storage medium of claim 1, wherein the processor is part of a first computing device, and the consumable item comprises an enclosure on which an identifier is disposed, and wherein the processing further comprises receiving the identifier of the consumable item over a network from a second computing device that read the identifier or at which the identifier has been input.

8. The non-transitory computer-readable data storage medium of claim 7, wherein the receiving the parameters comprises receiving the parameters particular to the consumable item having the identifier over the network from the second computing device, and wherein the processing further comprises transmitting the payload over the network to the printing device in which the consumable item is installed for storage within the consumable item.

9. The non-transitory computer-readable data storage medium of claim 8, wherein the identifier is a first identifier of the consumable item, and the processing further comprises:

looking up a second identifier of the consumable item associated with the first identifier;

receiving the second identifier of the consumable item over the network from the printing device in which the consumable item having the second identifier is installed; and in response to receiving the second identifier of the consumable item, transmitting the payload to the printing device for storage within the consumable item.

10. The non-transitory computer-readable data storage medium of claim 9, wherein the consumable item comprises a security-hardened integrated circuit (IC) storing the second identifier and readable just by corresponding security hardware of the printing device.

11. A method comprising:

providing parameters particular to a consumable item that affect calculation of an estimated remaining life of the consumable item when used in a printing device for printing; and causing the printing device to use a payload constructed based on the parameters when calculating the estimated remaining life of the consumable item during usage of the consumable item for printing.

12. The method of claim 11, wherein the printing device is to perform an action in response to the calculated estimated remaining life decreasing below a threshold.

13. The method of claim 11, further comprising determining an identifier of the consumable item by installing the consumable item within the printing device, and wherein security hardware of the printing device responsively reads the identifier from a security-hardened integrated circuit (IC) readable just by the security hardware and transmits the identifier to a cloud service that constructs and transmits the payload to the printing device for storage within the consumable item.

14. The method of claim 11, further determining an identifier of the consumable item by causing a computing device to read a first identifier of the consumable item disposed on an enclosure of the consumable item, and wherein the computing device responsively transmits the first identifier to a cloud source that looks up a second identifier of the consumable item associated with the first identifier and that constructs and transmits the payload to the printing device in which the consumable item having the second identifier is installed for storage within the consumable item.

15. The method of claim 11, wherein providing the parameters comprises either:

entering the parameters at a computing device, the computing device then transmitting the parameters to a cloud service that constructs and transmits the payload to the printing device in which the consumable item is installed for storage within the consumable item;

entering the parameters at the computing device, the computing device then transmitting the parameters directly to the printing device in which the consumable item is installed, the printing device constructing and storing the payload within the consumable item; or entering the parameters at user input hardware of the printing device in which the consumable item is installed, the printing device constructing and storing the payload within the consumable item.

16. The method of claim 11, wherein causing the printing device to use the payload when calculating the estimated remaining life of the consumable item during usage comprises:

providing the consumable item to an end user of the printing device that installs the consumable item within the printing device.

17. The method of claim 16, wherein the printing device is a first printing device, and causing the printing device to use the payload when calculating the estimated remaining life of the consumable item during usage further comprises:

prior to providing the consumable item to the end user removing the consumable item from a second printing device in which the consumable item has been installed to read and transmit an identifier of the consumable item to a cloud service.

18. A printing device comprising:

printing hardware to print using a consumable item; and a control circuit to either:

construct and store a payload based on parameters particular to the consumable item and that affect calculation of an estimated remaining life of the consumable item when used during printing; or receive and store the payload as has been constructed based on the parameters.

19. The printing device of claim 18, wherein the control circuit is to further:

cause the printing hardware to print using the consumable item;

calculate the estimated remaining life of the consumable item after printing; and perform an action in response to the calculated estimated remaining life decreasing below a threshold.

20. The printing device of claim 18, wherein the control circuit is to either:

receive the parameters based on which the payload is constructed and stored; or transmit an identifier of the printing device in response to which the payload is received and stored.

* * * * *